United States Patent [19]

Noda et al.

[11] Patent Number: 4,560,024
[45] Date of Patent: Dec. 24, 1985

[54] AUTOMATIC RUNNING SPEED CONTROL FOR AUTOMOTIVE VEHICLES

[75] Inventors: Munetaka Noda, Chiryu; Takahiko Muto, Kariya; Motoyoshi Suzuki, Kariya; Yutaka Ninoyu, Kariya, all of Japan

[73] Assignee: Nippondenso Co., Ltd., Kariya, Japan

[21] Appl. No.: 430,606

[22] Filed: Sep. 30, 1982

[30] Foreign Application Priority Data

Oct. 8, 1981 [JP] Japan ................................ 56-161162

[51] Int. Cl.$^4$ ............................................. B60K 31/00
[52] U.S. Cl. ..................................... 180/176; 74/866; 74/870; 123/352
[58] Field of Search ............... 180/176, 177, 178, 179; 123/352; 74/866, 870, 871, 878

[56] References Cited

U.S. PATENT DOCUMENTS

| 3,386,316 | 6/1968 | Armantrout | 74/870 |
| 4,258,591 | 3/1981 | Eckert et al. | 74/870 X |
| 4,328,776 | 5/1982 | Kuno et al. | 180/179 X |
| 4,406,181 | 9/1983 | Kubo et al. | 74/878 X |
| 4,411,174 | 10/1983 | Yoki et al. | 74/878 X |
| 4,421,192 | 12/1983 | Ito et al. | 180/179 |
| 4,434,469 | 2/1984 | Suzuki et al. | 180/176 X |
| 4,463,822 | 8/1984 | Tanigawa et al. | 180/177 |

Primary Examiner—Joseph F. Peters, Jr.
Assistant Examiner—Michael Mar
Attorney, Agent, or Firm—Cushman, Darby & Cushman

[57] ABSTRACT

An automatic running speed control system for an automotive vehicle in which there are provided a plurality of control switches including a set switch and capable of selectively setting changing drive conditions of a car and a control unit which includes a memory for storing set car speed, a comparator for comparing the actual car speed detected by a speed sensor with the set car speed read from the memory, and an overdrive cut circuit for inhibiting an overdrive condition of an automatic transmission when a fine speed reduction operation is performed by the operation of the set switch or speed reduction switch. With this construction, the automatic constant speed running of a car is performed so as to equalize the actual car speed to the set car speed stored in the memory, while the overdrive condition of the automatic transmission can be inhibited or prevented by the operation of a particular switch such as the set switch. Accordingly, engine brake acts well in this system, and a quick speed reduction is realized by the control unit associated with a fine speed reduction switch with a good response.

9 Claims, 3 Drawing Figures

AUTOMATIC RUNNING SPEED CONTROL FOR AUTOMOTIVE VEHICLES

BACKGROUND OF THE INVENTION

1. Field of the Invention

The present invention relates to an automatic running speed control system for automotive vehicles, particularly to an automatic running speed control system for automotive vehicles capable of realizing constant running by a switch operation including overdrive area and also capable of carrying out a fine speed reduction of the car.

2. Description of the Prior Art

Generally, in an automatic running speed control system, when a set switch is operated by a driver in a predetermined car running area such as 40 km/h (24.9 mile/h) to 100 km/h (62.2 mile/h) of running, the car speed at the time of operating the switch, i.e., the time of shifting to the off condition after operating the set switch to on becomes the set car speed when carrying out the automatic constant speed running. After that, a throttle valve of an air intake system of the engine is automatically controlled so as to always coincide the car speed with the set car speed. In this case, when controlling the throttle valve opening, an acutator which is normally a diaphragm type and having a release valve for controlling the communication to open air and a control valve for controlling the negative pressure which occurs in the engine air intake is normally used, whereby the conduction time for the control valve is controlled under the closed condition of the release valve so as to set the operating amount of the throttle valve due to the negative pressure in accordance with the conduction time.

Moreover, in this kind of system, according to the prior art, it is constructed in such a manner that a fine speed reduction can be performed by a switch operating during the automatic constant speed running and when the switch operation is carried out, the throttle valve opening is gradually reduced through the actuator and the car speed is in turn, gradually lowered thereby.

The above-mentioned conventional car includes the overdrive area as a speed changing means, when a find speed reduction operation is performed, however there is a tendency that some difficulties exist in the engine brake because of the gear ratio of less than 1 for the overdrive. Moreover, the response to the engine is not good due to the coming out of the torque converter, thus making the operation of a sufficient and effective fine speed reduction difficult.

SUMMARY OF THE INVENTION

It is therefore a main object of the present invention to provide an automatic running speed control system in which a quick speed reduction with a good response can be performed by a fine speed reduction switch during the constant speed running or cruising.

It is another object of the present invention to provide an automatic running speed control system in which the overdrive is prevented by operating a set switch or by performing the fine speed reduction while a quick speed reduction is realized.

According to one of the features of the present invention, in the automatic constant speed running device for a car, there is provided an overdrive cut circuit for preventing the car from being driven in overdrive condition when the fine speed reduction switch is operated.

Other objects or advantages of the present invention will become apparent from the detailed description of the invention in conjunction with the accompanying drawings.

DETAILED DESCRIPTION OF THE PREFERRED EMBODIMENT

Figure 1:
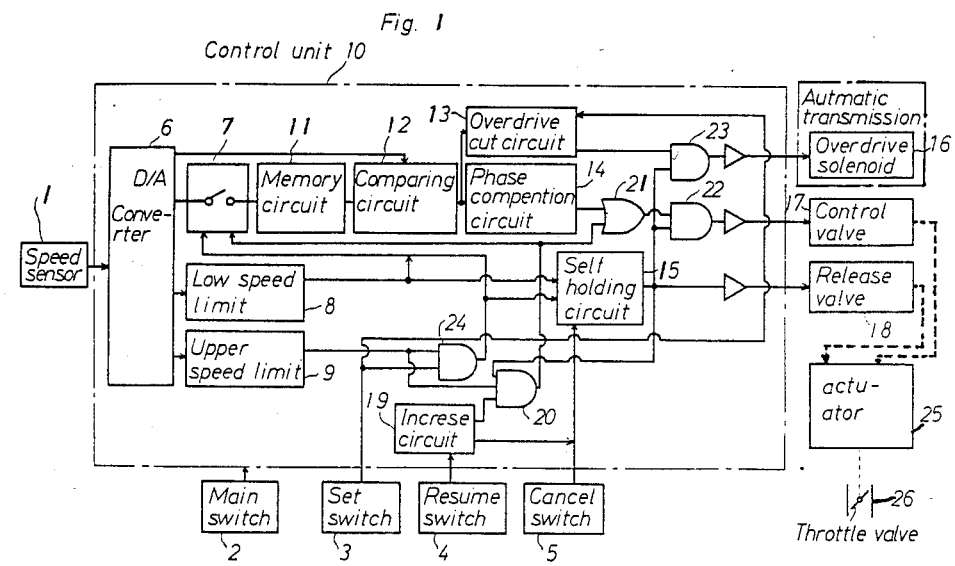
FIG. 1 is a block diagram of one embodiment of the automatic running speed control for automotive vehicles according to the present invention.

Referring to FIG. 1, the automatic running speed control system according to the present invention mainly comprises an automotive car speed sensor 1, an electronic control unit 10, a plurality of switches 2 through 5, namely a main switch 2, a set switch 3, a resume switch 4, and a cancel switch 5, an overdrive solenoid 16, a control valve 17, and a release valve 18.

The solenoid 16 is installed in an automatic transmission. The automatic transmission is provided with, in addition to the first speed gear, second speed gear and third speed gear, a fourth speed gear being called an overdrive gear, whose speed reduction ratio is less than one. When the solenoid 16 is turned ON, the speed reduction is effected as the first through fourth speed reduction ratios. When the solenoid 16 is turned OFF, the fourth speed is inhibited and the vehicle speed reduction ratios.

The control unit 10 comprises a D/A converter 6 which converts digital signals into analog signals, an analog switch 7, a memory 11, a comparator 12, an overdrive cut circuit 13, a phase compensation circuit 14, a low speed limit circuit 8, a high speed limit circuit 9, a self holding circuit 15, an OR gate 21, an increase circuit 19, a plurality of AND gates 20, 22, 23 and 24 namely, the first gate, the second gate and the third gate and amplifiers. The memory 11 is connected to the analog switch 7 so as to store an analog signal corresponding to car speed which comes from the D/A converter 6 through the analog switch 8, by utilizing ON to OFF turning signal from the set switch 3.

The comparator 12 is connected to the D/A converter 6 and to the memory 11 in such a manner that car speed data which is a predetermined car speed set by the setting operation and stored in the memory 11 is compared with actual car speed or current car speed sent from the D/A converter 6. The output of the comparator 12 is connected to the input of the overdrive circuit 13 and the phase compensation circuit 14. The output signal from the comparator circuit 12 is used for controlling the conduction time of the control valve 17 to the actuator in accordance with the result of the comparison.

The phase compensation circuit 14 is used for compensating the delay in control caused by the delay in operation of a mechanical system, such as the throttle valve, the actuator, etc. The output of the phase compensation circuit 14 is connected to the control valve 17 through the OR gate 21 and the AND gate 22. The low speed limit circuit 8 and the high speed limit circuit 9 are provided for realizing the automatic constate speed running at a constant car speed, for instance, 40 km/h (24.9 mile/h) to 100 km/h (62.2 mile/h).

The self holding circuit 15 is provided so as to close the release valve 18 in response to the set signal generated by pushing the set switch 3 and for securing a predetermined running of a car by closing the release valve 18. The input of the increase circuit 19 is connected to the resume switch 4 so as to send a speed increase signal to an operating circuit (not shown) in the control valve 17 through the AND circuit 20 and to increase the speed higher than the set car speed when the resume switch 4 is used as a fine speed increase switch.

The overdrive cut circuit 13 is provided so as to produce an overdrive cut signal during the overdrive running with the overdrive cut circuit 13 being in the set condition in such a case when the car is ascending a slope and the actual car speed drops below a predetermined set speed, in response to the output signal from the comparator 12, and the overdrive cut signal thus produced is applied to the overdrive solenoid 16 through the gate 23. Namely, the overdrive cut circuit 13 has a function to prevent the car being driven in the overdrive condition by means of the inhibit signal when the set switch 3 is used as a fine speed reduction switch, i.e., when the set switch 3 is again pushed and the fine speed reducing operation so-called "coast operation" is performed during the automatic constant speed running by setting a predetermined car speed.

Referring to the different switches, the set switch 3 is for setting the automatic constant speed running command to the control unit 10. The set switch 3 also has a function as a fine speed reducing switch when operated continuously, during the automatic constant speed running as well as a function as an overdrive inhibit switch. Namely, when the set switch 3 is operated during the automatic constant speed running, it stops the output from the memory 11 during its ON time and the energization to the actuator having the electromagnetic control valve 17 and the electromagnetic release valve 18 and a pneumatic servomotor 19 for controlling the throttle valve for speed regulating members such as an engine air intake by the adjustment of the air pressure in a diaphragm chamber. The actuator which has controlled the automatic constant speed running is released at that time, thus the fine car speed reduction is performed while the car is prevented from being driven in the overdrive condition by the overdrive cut circuit 13.

The resume switch 4 is connected to the increase circuit 19 in the control unit 10 so as to send a signal from the increase circuit to the control valve 17 through the AND gate 20, the OR gate 21, and the AND gate 22. When the resume switch 4 is turned from ON to OFF, the analog switch 7 is turned OFF and the actual car speed signal which has been stored in the memory 11 till that time becomes a new set speed after the speed increase so as to resume the constant running of the car.

The cancel switch 5 which consists of a plurality of switches, such as a stop lamp switch, a neutral switch, a parking brake switch, and the like, is for releasing the self holding circuit 15 as well as for deenergizing the actuator through the release valve 18 and for cancelling the automatic constant speed running.

The operation of the resume switch 4 enables the cancel switch 5 to be turned ON and the output from the self holding circuit 15 in the control unit 10 to be in OFF condition and as a result, the release valve 18 is opened, thus cancelling the automatic constant speed running. After automatic constant, the resume switch 4 has been turned from ON to OFF, the self holding circuit 15 again produces a high level signal (HI signal) and the release valve 18 is closed in response to the HI signal, thus carrying out the automatic constant speed running by retrieving the set car speed to that being set before the cancel of automatic constant speed running is performed.

The operation of the automatic constant speed running device thus constructed will now be described especially concerning the find speed reducing operation by the set switch 3 and by a set operation of a set speed that is performed when the car is running at set speed.

First of all, supposing that a car is driven a normal running speed that is within the restricted speed area defined by the lower speed limit and the upper speed limit set by the low speed limit circuit 8 and the high speed limit circuit 9, a control signal is applied to the analog switch 7 through the AND gate 24 when the set switch 3 is turned ON for the purpose of entering the automatic constant control running. Then, the analog switch 7 is turned ON and the voltage corresponding to the current or actual car speed is applied to the memory 11 and is stored therein. At the same time, the HI signal generated by pushing the set switch 3 is also applied to the self holding circuit 15 and the drive signal is produced from the circuit 15 and then the release valve 18 of the actuator is closed by the drive signal, thus enabling the operation of the control valve 17 to be controlled. Next, when the set switch 7 is turned from the switched ON condition to the OFF condition, the control signal to the analog switch 7 is interrupted and is turned OFF, while the voltage corresponding to the car speed at this time is produced from the memory 11 and is applied to a first input shaft of the comparator 12. In the comparator 12, the actual car speed which is applied from the speed sensor 1 to the second input shaft of the comparator 12 through the D/A converter 6 is compared with the set car speed and the duty of pulse signals to be applied to the control valve 17 of the actuator is calculated in accordance with the difference between the two signals so as to control the condution time of the control valve 17. The output thus produced from the comparator 12 is sent to the control valve 17 through the phase compensation circuit 14, the OR gate 21 and the AND gate 22. Accordingly, when the actual car speed is lower than the set car speed, pulse signals in proportion to the ratio of the conduction time are produced from the comparator 12. On the contrary, when the actual car speed is higher than the set car speed, the pulse signals with less conduction time ratio are produced therefrom in accordance with the difference and the operation of the engine throttle of the actuator is controlled by the opening of the control valve 17, thus realizing the automatic constant speed running so as to equalize the actual car speed to the set car speed.

On the other hand, when the set switch 3 as a fine speed reducing switch is pushed and the fine speed reduction operation is carried out during the automatic constant speed running, the control signal is applied to the analog switch 7 and as a result, the analog switch 7 is rendered conductive, thus applying from the D/A converter 6 the voltage corresponding to the actual car speed to the memory 11 to store it. This causes the memory 11 to be in the reset condition and stops the output to the comparator 12. Accordingly, the drive signal which is being applied to the control valve 17 no longer exists and the negative pressure inlet of the diaphragm chamber is closed by the deenergized condition of the control valve 17, thus gradually operates the engine throttle in the direction of the speed reduction. Simultaneously, at this time, the HI signal from the set switch 8 is applied to the overdrive cut circuit 13 as an inhibit signal, so that the output side of the overdrive cut circuit 13 becomes in the HI condition and the AND gate 23 is opened, thereby the HI signal has been already produced from the output side of the self holding circuit 15 during the automatic constant speed running. The overdrive cut signal is applied to the overdrive solenoid 16 as a deenergizing signal, thus deenergizing the overdrive solenoid 16, and then the car is prevented from being driven in the overdrive condition. Therefore, the automatic speed changing device of the car is shifted down to the third speed gear, so that a suitable speed reducing control for car can be performed with a prefereable response by the speed reducing operation of the actuator in accordance with the deenergization of the control valve 17. In this case, the set switch 3 is kept turned ON until the car speed is increased to the desired car speed, and when it reaches the desired speed, the set switch 3 is turned from ON to OFF, the analog switch 7 is turned OFF similar to the case of the constant speed running set operation firstly described in the foregoing and the actual car speed at this time is newly stored in the memory 11 as the set car speed. The new set car speed signal thus stored in the memory circuit is read and applied to the first input shaft of the comparator 12 while the signal corresponding to the current car speed from the speed sensor 1 is also applied to the second input shaft of the comparator 12 through the D/A converter 6. Then, the comparison of the set car speed with the current car speed is performed in the comparator 12 and pulse signals with the controlled duty ratio, i.e., the pulse signals controlled in the ratio of the conduction time are applied to the control valve 17 of the actuator in accordance with the result of the comparison and the engine throttle is, in turn, controlled so as to equalize the actual car speed to the set car speed. Therefore, the automatic constant speed running is realized at the set car speed that is newly set.

Figure 2:
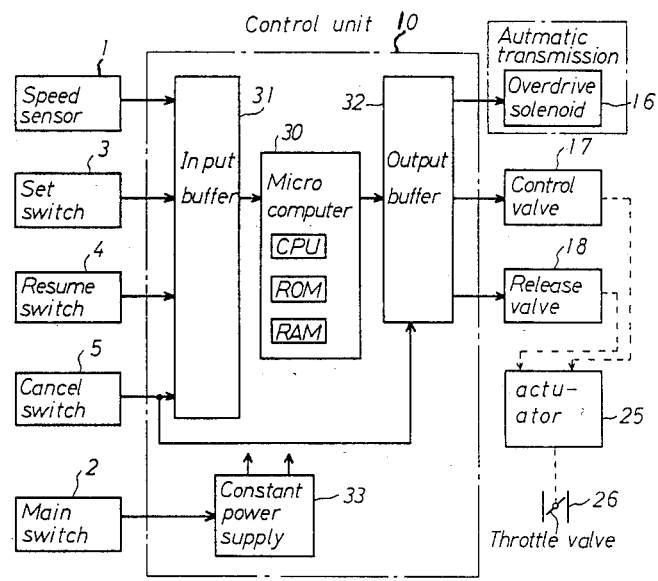
FIG. 2 is another embodiment according to the present invention.

FIG. 2 shows a block diagram of the other embodiment of the automatic running speed control system which utilizes a microcomputer 30, including a CPU, a ROM and a RAM and input and output buffers 31 and 32, instead of the control unit 10 using the analog circuit. In the Figure, there are provided as input devices for sending signals to the microcomputer 30 through the input buffer 31, a vehicle speed sensor 1, a setting switch 3, a resume switch 4, and a cancel switch 5 which are similar to those shown in FIG. 1 and as output devices driven by the output buffer 32, the overdrive solenoid 16, the control valve 17, the release valve 18, which are all the same as those in FIG. 1 and which are all connected to the microcomputer 30.

A constant voltage supply 33 to which a main switch 2 is connected is provided for the microcomputer 30. The construction of each constructing element for I/O such as the speed sensor 1 is the same as those shown in the first embodiment shown in FIG. 1 and more detailed explanation will not be necessary.

Figure 3:
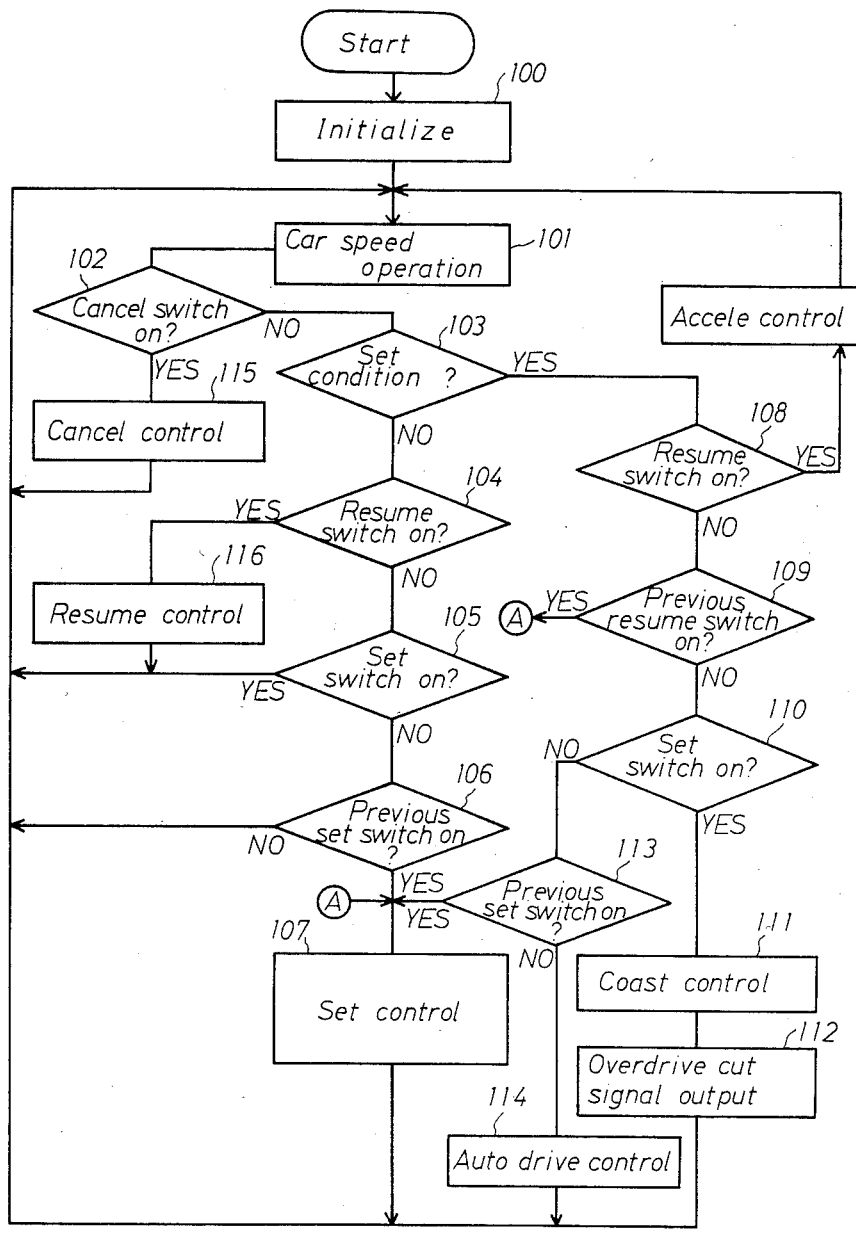
FIG. 3 is a flow chart of operation according to the present invention.

The operation of the system according to the present invention will be now described with reference to the flow chart shown in FIG. 3.

After the main switch 2 is turned ON during the car running, constant voltage is applied to the microcomputer 30, and the memory RAM and the CPU are initialized at the step 100 and the following processing operation is executed in accordance with program previously stored in the ROM.

Firstly, in case that the set switch 3 has not been operated and a car is being driven by a driver in a normal accelerator operation, a car speed calculation step 101 is executed and car speed data is calculated dependent on the actual car speed information from the speed sensor 1 in this step.

Next, a cancel operation decision step 102 is executed, while no cancel signal has been given so that the result of the decision becomes NO and now the operation is shifted to a set condition decision step 103.

In the set condition decision step 103, since no automatic constant speed running at the set car speed has not been yet performed, the result of the decision becomes NO and now a next resume switch decision step 104 is executed.

In the resume switch decision step 104, since the resume switch 4 has not been operated, the result of the decision becomes NO and the following set switch decision step 105 is executed.

In the set switch decision step 105, since the set switch 3 has not been operated ON, the decision result becomes NO and then a previous set switch ON decision step 106 is executed. In this step, since the set switch 3 has not been operated, the result of the decision becomes NO and now the processing sequence returns to the car speed calculation step 101 again and the closed loop including the steps 101 through 106 is repeatedly executed.

During the execution of the closed loop, the set switch 3 is operated and the shifting from ON to OFF condition of the set switch causes the result of the decision in the decision step 106 to be YES and a set control step 107 is executed. Then the release valve 18 is operated and now the diaphragm chamber is ready for receiving the vacuum control. At this time, an actual car speed is stored in the memory as a set car speed and an initial duty, i.e., the duty ratio of the pulse signals to be applied to the control valve 17 is calculated in accordance with the set car speed.

After that, if no switch input signal is applied to the circuit, the set condition continues and the closed loop for the automatic drive control is repeated. In this case, the actual car speed is compared with the set car speed and the conduction time to the control valve 17 is controlled in accordance with the result of the comparison so as to equalize the actual car speed to the set car speed.

In such set condition, when the set switch 3 is turned ON as the fine speed reduction operating switch, i.e., the switch for coast operation, the result of the decision in the set condition decision step 103 now changes to YES and a resume switch ON decision step 108 is executed. In this case, since the resume switch 4 has not been operated, the result of the decision becomes NO and the previous resume switch ON decision step 109 is executed. If the result of this decision is NO, then a following set switch ON decision step 110 is executed.

In this step, since the set switch 3 has been turned ON, the result of the decision becomes YES and the next coast control step, i.e., a fine speed reduction control step 111 and an overdrive cut signal output step 112 are executed.

In the coast control step 111, the ratio of the conduction time to the control valve 17 of the drive pulse signals is controlled so as to gradually reduce an actual car speed and the actuator is thus operated.

In the overdrive cut signal output 112, the overdrive cut signal is applied to the overdrive solenoid 16, the overdrive solenoid 16 is deenergized, and the overdrive condition in an automatic speed change device is shifted down to the third speed, so that the speed reduction in the coast operation is suitably performed with a preferable response. In this way, the continued pushing operation of the set switch 3 as a fine speed reduction switch in the set run condition allows a car speed to quickly and securely be reduced to the desired car speed.

On the other hand, after the coast operation was carried out by the continued pushing operation of the set switch 3, the shifting from ON to OFF condition of the set switch 3 causes the decision result in the set switch ON decision step 110 to change to NO and a previous set switch ON decision step 113 is now executed. As a result, the result of the decision becomes YES and then the set control similar to the above case is again carried out. This set control is performed as a re-set, i.e., alteration of the set car speed in the set operation and the car speed is re-set at lower than the first set car speed, which is reduced by the coast control. After the re-set is carried out, the result of the decision in the previous set switch ON decision step 113 becomes NO and then, the condution time to the control valve 17 is controlled so as to equalize an actual car speed to the set car speed, and thus an automatic drive control step 114 is executed. After that, unless a signal input from the input devices is not applied, this automatic drive control is maintained and the closed loop for the automatic drive control is repeated.

The remaining step 115 indicated that when the cancel switch 5 is turned ON during the automatic constant speed running, the latter running, is released. In the step 116, when the resume switch 4 is turned ON during the normal accelerator operation running after the release of the automatic constant speed running, the actual car speed returns to the set car speed at the time of the automatic constant speed running before the cancellation.

As described in the foregoing, in the automatic constant speed running device according to the present invention, a car speed signal from the car speed sensor is inputted into the D/A converter and after conversion an actual car speed is stored in the memory circuit in the control portion, the comparison of the set car speed with the actual car speed is performed in the comparator circuit in the control portion, and the conduction time of the control valve of the actuator is controlled in accordance with the result of the comparison through the fine speed reduction switch for performing the fine speed reduction operation while the overdrive cut circuit is provided in the control portion, thereby inhibiting the overdrive condition for a car when operating the fine speed reduction switch.

With this construction, during the running in the set condition an automatic speed change device can be shifted down to the third speed from the overdrive condition when the speed reduction switch and a car speed can be quickly reduced or decelerated to a desired car speed.

Moreover, in the system according to the present invention, a good speed reduction response is obtainable compared with the conventional kind of devices in which the fine speed reduction operation is performed under the overdrive condition and accordingly the response is not good due to the slip of the torque converter.

In the foregoing, some embodiments according to the present invention have been described, but it is apparent that various changes and modifications thereof can be made by replacing an element or elements with other equivalent element or elements without departing the spirit of the present invention and the appended claims.

We claim:

1. An automatic speed control system for an automotive vehicle having an automatic transmission including an overdrive, overdrive controller and control means for the vehicle of the type which automatically controls a throttle valve to maintain vehicle speed constant without requiring a driver's actuation of an accelerator pedal once the vehicle speed is set to a desired value comprising:
   a vehicle speed sensor for detecting the actual speed of the vehicle;
   a memory means including a set switch for storing the speed of the vehicle as the desired speed that is set as a set speed condition when said set switch is actuated by the driver;
   a holding means for holding said set speed condition when said memory means set switch is actuated;
   an adjusting means for adjusting a control signal to an actuator connected to a throttle valve to adjust the actual vehicle speed to that of said desired speed;
   deceleration switch means for effecting speed reduction and having an ON and an OFF condition, wherein said control means is responsive to the ON condition of said deceleration switch means when the set speed condition exists for terminating said control signal of said adjusting means so that the vehicle is in a coasting condition for speed reduction; and
   overdrive control means also responsive to the operation of said deceleration switch means to the ON condition while the vehicle is in the set speed condition for outputting an overdrive cut signal to the overdrive controller for downshifting the automatic transmission whereby speed reduction is achieved during the coasting condition.

2. An automatic speed control system for an automotive vehicle as claimed in claim 1 wherein said set switch serves as said deceleration switch means.

3. An automatic speed control for an automotive vehicle as claimed in claim 1 wherein said overdrive control means also outputs said overdrive cut signal when the actual vehicle speed falls below said desired speed by a predetermined amount.

4. An automatic speed control system for an automotive vehicle as claimed in claim 3 additionally comprising acceleration switch means, cancel switch means for interrupting the set speed condition, speed increase means outputting an increase signal for increasing the actual vehicle speed when said acceleration switch means is actuated, resume switch means and resuming means responsive to actuation of said resume switch means subsequent to actuation of said cancel switch means for retrieving the desired speed and resuming operation of said set speed condition, said desired speed being the set speed when an operation of automatic speed control was interrupted in response to actuation of said cancel switch means.